UNITED STATES PATENT OFFICE.

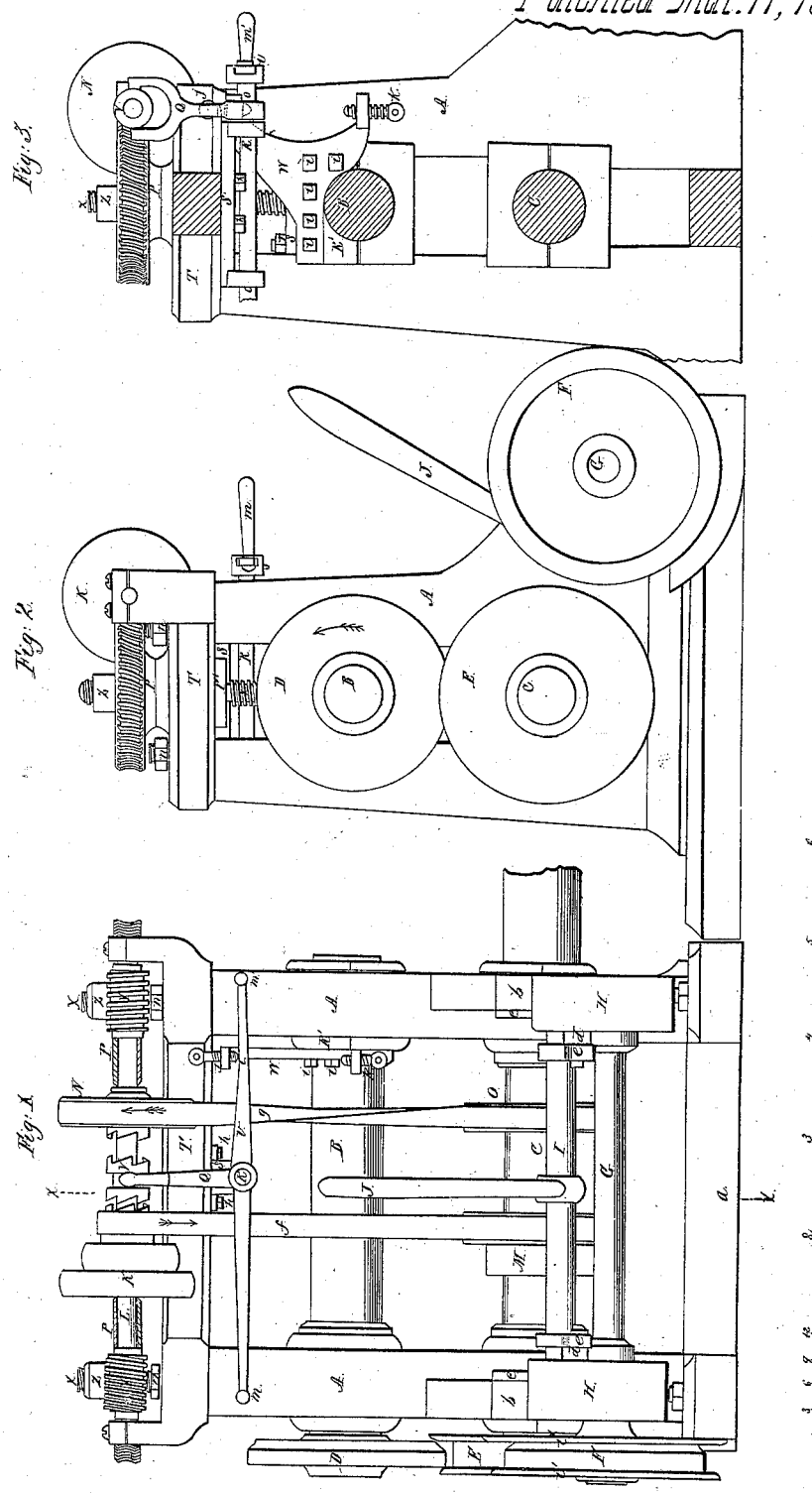

P. G. GARDINER, OF NEW YORK, N. Y.

MACHINERY FOR MAKING TIRES BY CONTINUOUS ROLLING.

Specification of Letters Patent No. 7,968, dated March 11, 1851.

*To all whom it may concern:*

Be it known that I, PERRY G. GARDINER, of the city, county, and State of New York, have invented a new and useful improvement on a machine to roll railroad wheel-tires from an annular mass of iron with a hole in the center without lop or other welding of the two ends of a bent bar; and I do hereby declare that the following is a full, clear, and exact description of the construction and operation of the same, reference being had to the annexed drawings, making a part of this specification, in which—

Figure 1 is a side and Fig. 2 is an end elevation; Fig. 3, is a section on a line from X, to X, (see Fig. 1).

The letters marked in the drawings indicate like parts in all of the figures.

The nature of my invention consists in giving, or furnishing a self acting and adjustable means of arresting motion (either way) of the top shaft and forming roller placed thereon, in making tires for railroad car or locomotive wheels—from a mass of iron formed in the bloom or piled and welded from bars or slabs, and forged by any ordinary means into a circular flat piece with a hole in the center; the piece must have an appropriate quantity or weight of metal to make a given section and diameter or tire. It is important that the rollers cease to act at the precise time, to secure the required diameter of tire to fit the wheel upon which it is thereafter to be set. In short, to roll such tire by the measure or judgment of the eye is in point of economy, impossible; but if the operator has the adjustable means by set screws or otherwise, to trip a sway bar, throw out of gear cog wheel work, or slide a belt on a loose pulley, he may by a few experimental trials, arrive at the exact point at which to arrest the advance and approach of the forming roller; and having ascertained this point, so set the parts fixedly, and by these means trip a lever, slide or move parts necessary to a stopping effect; so that all that remains of nicety to the operator to do, is to weigh accurately the mass of iron to be wrought or rolled into a tire; and making simple and easy that which would by the ordinary means of doing it be difficult of attainment.

I will now proceed to the general description of the machine, and afterwards, point out the parts which I deem to be new and patentable. A, the roller stands, made and secured in the ordinary way. B, the top main shaft; C, the lower main and the driving shaft of the machine; D, the top and E, the lower forming rollers; F, the guide roller, with double flange at the side of the face, to receive and hold in position, the tire as it leaves the forming rollers, and to prevent the tire from warping out of shape edgewise; which by a heavy reduction at the side forming the tread, is inclined so to do; such guide roller is placed upon shaft G,—which together with the forming rollers, are overhung their bearings at the outside of the stands for the convenience of approach to them, with the work to be done; which shaft G, turns in slide boxes H, H, which have their seats at $b$, $b$, upon the stands A,—they hook on to the back side of slide flanges $c$, $c$, which hold them in position to their seats on which they slide up and down.

$d$, $d$, are studs secured to the slide boxes H, H, and enter loosely slots in arms $e$, $e$, on rock shaft I, to which the hand lever J, is attached, and which through the parts just named, in immediate connection with the guide roller—the same is operated by the hand of the operator. The said rock shaft I, has its bearings in eyes made in the stands A, which at the section required, are of such width, as to admit of the same, without rendering the stand weak and defective.

K, is a cone of pulleys, turning loose on shaft L, and in line with a corresponding cone M, keyed fast to shaft C; which first named cone K, is operated and put in motion, by the cross belt $f$.

N, is a loose pulley on shaft L, the same is driven by the pulley O, (keyed fast to shaft C,) by the open belt $g$. Placed between the pulleys K, and N, on shaft L, is a clutch sleeve V, having clutch or grab notches, at each end, to take hold of corresponding notches, made in the ends of the hubs next to the clutch sleeve—in pulleys K and N; such clutch sleeve, slides loose lengthwise, on the shaft L, but held from turning round on the same, by a slide feather in the usual way; the pulleys K, and N, being put in motion by the shaft C, but turning freely on shaft L,—until clutched by the clutch sleeve V, of which, if so clutched to pulley K, downward motion is given to the top shaft, carrying with it, the top forming roller; if clutched to pulley N, the reverse is the case with such shaft and roller.

Q, is a clutch arm on rock shaft R, which last named shaft, turns in eyes on stands S'—fastened by screws *h*, to cap plate T, and on which shaft R, is fastened an arm, or trip lever U, which operates the clutch sleeve V; W, is an arm firmly and strongly attached, by tap screws, *i, i, i, i,* and *i*, (see Fig. 3) to the inside of the upper journal box, or cap of the shaft B, it being the up and down movable shaft; which arm W, is furnished with regulating and set screw, *k*, at the lower projection and part of arm, and a similar screw *j*, at the upper part; which arm of course rises and falls, corresponding with the up and down movement of the top shaft B—being fastened to it; when moving downward, the set screw *j*, will make contact with the trip lever U, at *l*, and through the clutch arm Q, slide the clutch sleeve V, on the shaft L, freeing the clutch from the pulley K, arresting rotation, and stopping the shaft L, upon which, the downward movement of the top shaft is dependent, and cease to reduce the tire between the rollers, but if the clutch sleeve V, be moved into contact with pulley N,—reverse motion will be given to such top shaft; but the motion upward will be arrested in its turn, by contact of the screw *k*, with the said trip lever U; there is sufficient space on the shaft L, for the clutch sleeve V, to remain unclutched to either of the pulleys K, or N if desired; in which case the top shaft will be at rest—as to up or down motion. And the trip lever U,—by the handle *m*, is worked by hand, to commence a movement of the top shaft—up or down, by clutching either way, as the case may require; Y, Y, are right and left hand screws—or worm gearing on shaft L, working into screw wheels P, which wheels are fastened to, and drive the main screws X, X, that give effect to the top shaft; such screw wheels P, are keyed fast to the nuts Z, Z; the cap plate T, is held down upon the top of the stands, by large screw bolts *n*, which pass up through the stands in the ordinary way; the nuts, Z, Z, are provided with heavy heads or collars at *p'* seen under the cap T, at Fig. 2, which with the screw wheel P, hold the nuts in position. The main screws X, X, are attached to the caps of the upper journal boxes—embracing the lower part of the box by large screw bolts *r* passing through the box, cap, and a plate S, (see Fig. 3,) under which plate the head on screws X, X, turns, and is secured.

What I claim as new and desire to secure in Letters Patent is,

1. Stopping the advancing movement of the movable toward the stationary roller, when the tire shall have attained its proper section, by means of self acting mechanism, acting and constructed substantially as herein described.

2. I also claim the combination of belts, pulleys, clutches, screws, and screw wheels, with the sway bar and triggers, by which a self acting advancing and retrograding motion is given to the movable roller, each motion changing to the other when caused so to do, by the hand of the operator, but self arrested and stopped by the set of the triggers, substantially as specified.

P. G. GARDINER.

Subscribed in presence of—
Thos. W. Harvey,
P. C. Van Wyck.